United States Patent [19]

Billeter

[11] 3,748,837

[45] July 31, 1973

[54] COMBINATION CUT-OUT COCK AND DIRT COLLECTORS

[75] Inventor: Henry R. Billeter, Deerfield, Ill.

[73] Assignee: Sloan Valve Company, Chicago, Ill.

[22] Filed: Jan. 18, 1971

[21] Appl. No.: 107,006

[52] U.S. Cl. ............... 55/418, 55/481, 137/549, 210/452, 251/315
[51] Int. Cl. ............................................. B01d 29/36
[58] Field of Search ................... 55/417, 418, 481; 210/452, 418, 435, 450, 419, 429–432; 137/549; 251/315

[56] References Cited
UNITED STATES PATENTS

| 973,043 | 10/1910 | Hicks | 55/417 |
| 1,601,437 | 9/1926 | Gustafson et al. | 210/437 |
| 1,722,804 | 7/1929 | Kleinlercher | 210/442 |
| 2,839,074 | 6/1958 | Kaiser | 251/315 |
| 3,220,694 | 11/1965 | Eschbaugh | 251/474 |
| 3,240,342 | 3/1966 | Callahan Jr. et al. | 210/450 |
| 3,184,212 | 5/1965 | Billeter | 137/315 |

FOREIGN PATENTS OR APPLICATIONS

| 1,304,723 | 8/1962 | France | 251/315 |

*Primary Examiner*—Bernard Nozick
*Attorney*—Parker, Carter & Markey

[57] ABSTRACT

This combined cut-out cock and dirt collector for the brake pipe of railroad cars has a filter passage between the inlet and outlet passages with a ball valve at the entrance to the filter passage. A removable hollow filter element is in the filter passage and is spring pressed against the ball valve and in sealing engagement therewith.

8 Claims, 4 Drawing Figures

PATENTED JUL 3 1 1973 3,748,837

INVENTOR.
HENRY R. BILLETER
BY
PARKER, CARTER & MARKEY
ATTORNEYS

COMBINATION CUT-OUT COCK AND DIRT COLLECTORS

BACKGROUND OF THE INVENTION

This valve provides a means for closing the air brake pipe connection between the AB control valve on a railroad car and the brake pipe, to isolate that particular car in a train and to prevent the entrance of pipe scales, sand, cinders and foreign particles into the delicate operating parts of the AB control valve from the brake pipe.

Prior cut-out cocks and dirt collectors were not always reliable and satisfactory in operation because the plug type valve member did not provide a good air seal in the closed position, and the dirt collector, usually of the centrifugal type was not very effective in trapping all the dirt or smaller particles passing through the brake pipe.

It is accordingly the object of the invention to provide a new and improved combined cut-out cock and dirt collector for the aforesaid purpose having certain novel features which make it leak-proof and more reliable in operation, which filters out foreign particles in a more certain and dependable manner, may be produced in an economical manner over former types of valves, and which is readily assembled or taken apart for inspection and repair.

BRIEF DESCRIPTION OF THE DRAWINGS

FIG. 3 is a cross-section of a modification in which the filter element is not used; while

Referring to FIG. 1 and 2 the body or casing 5 of the cut-out cock is formed of a casting having several openings therein. A flange 6 is formed at the air inlet end 7 having threaded bolt holes therein for connection to the branch pipe extending from the usual air brake pipe line on the railway car. At the outlet end 8 of the casing 5 another flange 9 is formed having bolt holes therein for attachment of the cut-out cock directly to the body of the AB Control Valve of the railway car. A third chamber 10 is for accommodation of a filter element.

Figure 1:
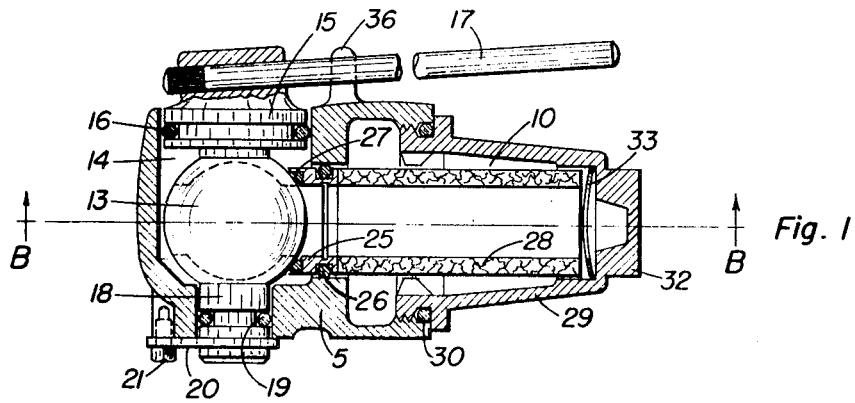
FIG. 1 is a cross-sectional view of a preferred embodiment of the invention, taken along the line A—A of FIG. 2.
Figure 4:
FIG. 4 is a view of the locking clip for holding the ball valve in the valve body.

A ball type valve member 13 is arranged for rotation in the valve chamber 14 formed in the body 5. At one end the ball valve member 13 is provided with an integral bonnet portion 15 for reciprocal movement therewith. The bonnet 15 passes through another opening in the top of the body 5 where it is in air tight sealing engagement with the body 5 by means of the O-ring 16. At the top of the bonnet 15 an operating handle 17 is suitably attached as by a drive fit connection through the bonnet 15. At the bottom end the ball valve member 13 is formed with an integral support bearing 18 extending through an opening in the body 5. A suitable O-ring 19 around the support 18 seals the support in the body while permitting rotation of the support. The ball valve member 13 is readily assembled as a unit by inserting the support bearing 18 and bonnet 15 in their respective body openings with the valve member in chamber 14. In order to secure the assembly in place a clip 20 is inserted around a recess and protruding shoulder on the end of support bearing 18 and the clip locked in place by the bolt 21 threaded in the valve body 5.

The cut-out cock is provided with a filtering element 28 which is inserted in the chamber 10. It comprises an elongated stiff tubular member 28 preferably formed of porous sintered and pressed metal into the shape shown. A cup-shaped enclosing cover 29 forms the chamber 10 within which the filter is supported. The cover 29 is threaded into the body opening by the nut 32 on the cover and sealed to the body with the O-ring 30. A bowed spring washer 33 between the end of the filter 28 and the cover 29 normally urges the filter toward the ball valve 13 in the chamber 10. The lugs 34 on the inside of the cover 29 serve to center and help support the filter element 28 in position.

The inward end of the filter 28 abuts a sealing member 25 in the form of a ring having an O-ring 26 recessed around it which is in sealing engagement with the passage between the ball valve 13 and the outlet 8. The sealing member 25 also has a rubber seal ring supported in its outer end in slidable and sealing engagement with the ball valve 13. It is urged against the valve member by the bowed washer 33 on the other end of the filter.

Figure 2:
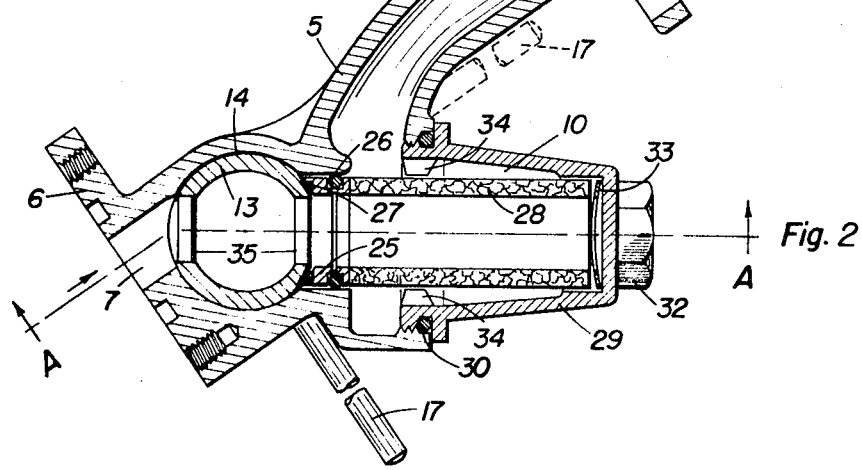
FIG. 2 is a cross-section taken along the line B—B of FIG. 1.

With the operating handle 17 in the valve open position as shown, the passage through the valve extends from the inlet 7, ball valve opening 35, the inside of filter element 28, and out through the filter outlet passage 8. All chips, dirt and other foreign substances are effectively trapped by the filter and inside of it. When it is necessary to clean out the filter or to replace it, the cap nut 32 easily unscrews the cover 29 from the body 5 to remove the filter. This can be accomplished even though air pressure may be present at the inlet side of the valve because the ball valve member can be closed when the handle 17 is moved to its alternate or closed position indicated in dotted lines in FIG. 2. In the closed position of the ball valve member 13 communication between the inlet 7 and outlet 8 is cut off and leakage or back pressure is prevented through the ball valve member by the seals 26 and 27. A lug 36 formed on the valve body 5 limits the opening movement of the handle 17 and the ball valve member 13. A similar lug, not shown, limits the valve closing movement of the handle.

Figure 3:
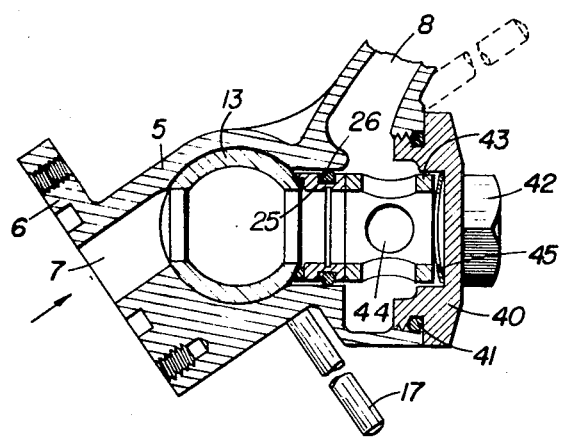

There are many instances in railway practice where the use of a filter element such as 28 is not necessary. In such cases the filter is merely removed and the cover 29 screwed back in place. If a filter is originally not required the arrangement of FIG. 3 is provided. This consists of a cover 40 screwed into the body opening and sealed thereto by the O-ring 41. The nut 42 facilitates this action. Arranged between the inside of the cover 40 and the sealing member 25 lying against the ball valve 13, is a sleeve 43 having air openings 44 around its side to permit passage of air from the inlet 7 to the outlet 8 when the valve is in open position.

Special attention is called to the type of material constituting the make up of the cut-out cock and dirt collector. The body 5 and flanges 6 and 9 as well as the filter cover 29 are preferably made of cast iron. However the ball valve 13 including the integral bonnet 15 and bearing 18 are made of brass properly machined to fit in the chamber 14. By making these parts of brass there is less possibility of the ball valve becoming solidly seized in the open position after long periods of disuse.

The movement of the ball valve between open and closed positions is accomplished smoothly and easily without sticking, and outward leakage is effectively prevented by the O-rings 16 and 19. The sealing ring 25 and its seals 26 and 27 insure that leakage does not occur past the ball valve 13. The filter element 28 is suitably molded into the cylindrical shape shown of porous sintered metal of known material and stiff enough and self supporting so it remains solid under adverse conditions of vibration and shock. It can therefore be easily removed and replaced when necessary.

What is claimed is:

1. A combined cut-out cock and dirt collector for a railroad car including a valve body, first and second chambers in said body, an inlet passage opening into said first chamber, an outlet passage opening into said second chamber, a passage connecting said chambers, a movable ball valve having a passage therethrough mounted in said first chamber controlling the flow of air to said second chamber, means for moving said ball valve, a seal member positioned in said connecting passage and abutting said ball member, a sleeve having air passages therein positioned in said second chamber with one end abutting said seal member, spring means positioned in said second chamber between said other sleeve end and valve body and yieldingly urging said sleeve against said seal member and said seal member into sealing contact with said ball member.

2. The structure of claim 1 further characterized in that said sleeve is a filter.

3. The structure of claim 1 further characterized in that said sleeve is generally imperforate with a plurality of spaced air passages therein.

4. The structure of claim 1 further characterized by an elongated enclosure forming a portion of said valve body and defining said second chamber, and wherein the means for moving said ball valve includes an operating handle extending through the side of said valve body.

5. The structure of claim 4 further characterized in that said elongated enclosure is removably attached to the valve body and has lugs formed on the inner sides thereof to position said sleeve.

6. The structure of claim 4 further characterized in that said sleeve has an annular sealing member about the periphery thereof, generally adjacent said one end, and in sealing engagement with the connecting passage.

7. The structure of claim 4 further characterized by first and second bearings forming a part of said ball valve on opposite sides thereof for mounting said ball valve within said valve body.

8. The structure of claim 4 further characterized in that there are stops on the exterior of said valve body for limiting movement of said operating handle.

* * * * *